(12) United States Patent
Lee

(10) Patent No.: US 12,390,314 B2
(45) Date of Patent: Aug. 19, 2025

(54) TOOTH MODEL FOR TOOTH TREATMENT PRACTICE AND METHOD FOR MANUFACTURING THE SAME

(71) Applicants: B&L BIOTECH, INC., Ansan-si (KR); In Whan Lee, Ansan-si (KR)

(72) Inventor: In Whan Lee, Seoul (KR)

(73) Assignee: B&L BIOTECH, INC., Ansan-si (KR)

( * ) Notice: Subject to any disclaimer, the term of this patent is extended or adjusted under 35 U.S.C. 154(b) by 944 days.

(21) Appl. No.: 17/496,923

(22) Filed: Oct. 8, 2021

(65) Prior Publication Data

US 2023/0000601 A1   Jan. 5, 2023

(30) Foreign Application Priority Data

Jul. 1, 2021   (KR) .................. 10-2021-0086444

(51) Int. Cl.
| | | |
|---|---|---|
| *A61C 13/34* | (2006.01) | |
| *A61C 13/00* | (2006.01) | |
| *A61C 13/087* | (2006.01) | |
| *G09B 23/28* | (2006.01) | |

(52) U.S. Cl.
CPC .......... *A61C 13/34* (2013.01); *A61C 13/0006* (2013.01); *A61C 13/087* (2013.01); *G09B 23/283* (2013.01)

(58) Field of Classification Search
CPC .......... A61C 13/30; A61C 5/50; A61C 13/34; A61C 13/0022; A61C 5/77; A61C 13/09; G09B 23/283; G09B 23/28
See application file for complete search history.

(56) References Cited

U.S. PATENT DOCUMENTS

| | | | |
|---|---|---|---|
| 3,947,967 | A | 4/1976 | Satake |
| 5,503,562 | A | 4/1996 | Mays |
| 7,713,063 | B2 | 5/2010 | Lee et al. |
| 9,060,832 | B2 * | 6/2015 | Karim ................ A61C 13/0019 |
| 2003/0148247 | A1 | 8/2003 | Sicurelli, Jr. et al. |
| 2008/0026353 | A1 | 1/2008 | Chyz |
| 2010/0015588 | A1 * | 1/2010 | Funakoshi ........... G09B 23/283 |
| | | | 434/263 |
| 2013/0040110 | A1 | 2/2013 | Matsui et al. |

(Continued)

FOREIGN PATENT DOCUMENTS

| | | |
|---|---|---|
| CN | 209543395 U | 10/2019 |
| CN | 110491265 A * | 11/2019 |
| JP | 51-57993 A | 5/1976 |

(Continued)

OTHER PUBLICATIONS

Cao Zhiyong, Tooth model for pulp opening operation, Nov. 22, 2019 (Year: 2019).*

(Continued)

*Primary Examiner* — Dmitry Suhol
(74) *Attorney, Agent, or Firm* — Sughrue Mion, PLLC

(57) ABSTRACT

A tooth model for dental treatment practice is composed of a transparent material and includes a root canal in which a hollow neural tube is formed and a crown formed on top of the root canal, wherein a coating layer is formed inside the neural tube by applying a paint based on an opaque material to an inner surface of the neural tube, so as to show the neural tube formed inside the root canal to the outside.

5 Claims, 4 Drawing Sheets

(56) References Cited

U.S. PATENT DOCUMENTS

2016/0365008 A1* 12/2016 Lee .................... G09B 23/283

FOREIGN PATENT DOCUMENTS

| | | | |
|---|---|---|---|
| JP | 2012-078644 A | | 4/2012 |
| JP | 2014239846 A | * | 12/2014 |
| JP | 2018-13626 A | | 1/2018 |
| KR | 10-2010-0090563 A | | 8/2010 |
| KR | 101714667 B1 | * | 3/2017 |
| KR | 10-2017-0130314 A | | 11/2017 |
| KR | 10-2019-0143108 A | | 12/2019 |

OTHER PUBLICATIONS

Ito Akane, Cylindrical High-functional Dental Pulp Model, Dec. 25, 2014 (Year: 2014).*
Office Action issued Jan. 17, 2023 in Japanese Application No. 2021-199665.
Extended European Search Report issued May 6, 2022 in European Application No. 21213155.1.
Office Action issued May 30, 2023 in Korean Application No. 10-2021-0086444.
Communication dated Jun. 24, 2024, issued in Korean Application No. 10-2021-0086444.
Office Action dated Oct. 10, 2022 issued by the Australian Patent Office in Australian Application No. 2021245261.
Chinese Office Action dated May 6, 2025 in Application No. 2021111879192.

* cited by examiner

[FIG. 1]
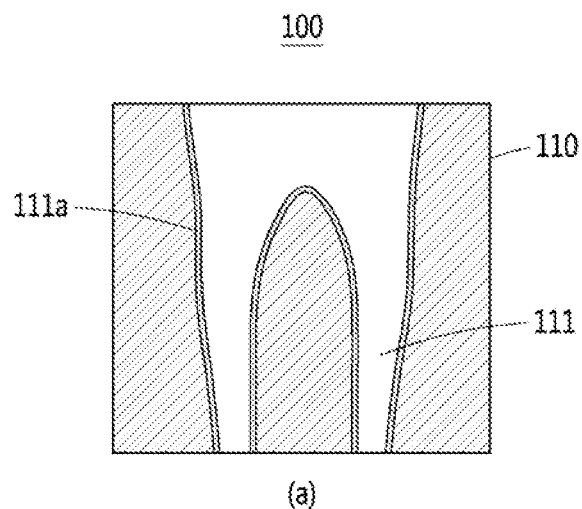
(a)
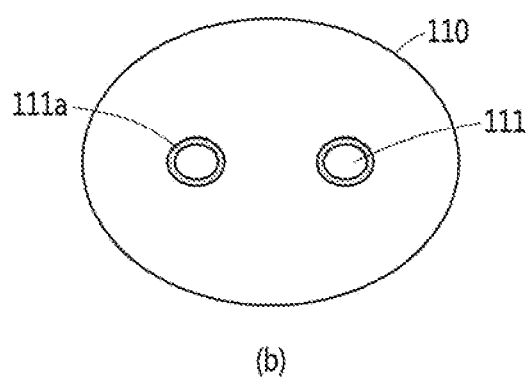
(b)

[FIG. 2]
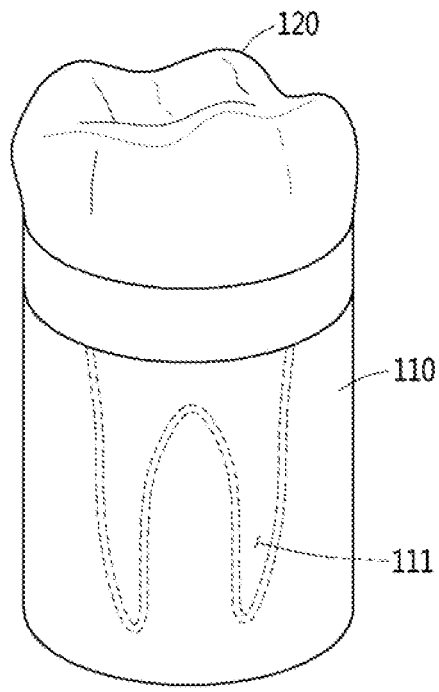
[FIG. 3]
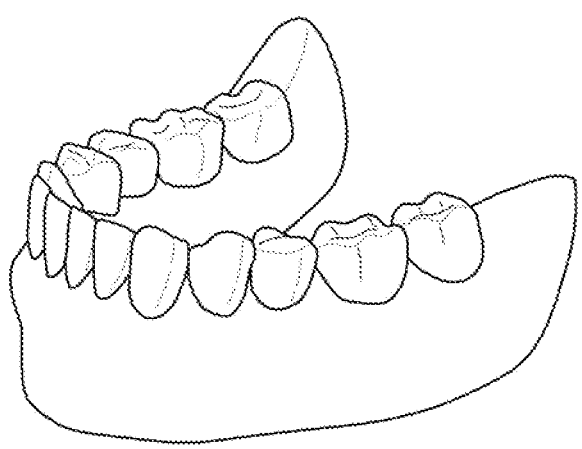

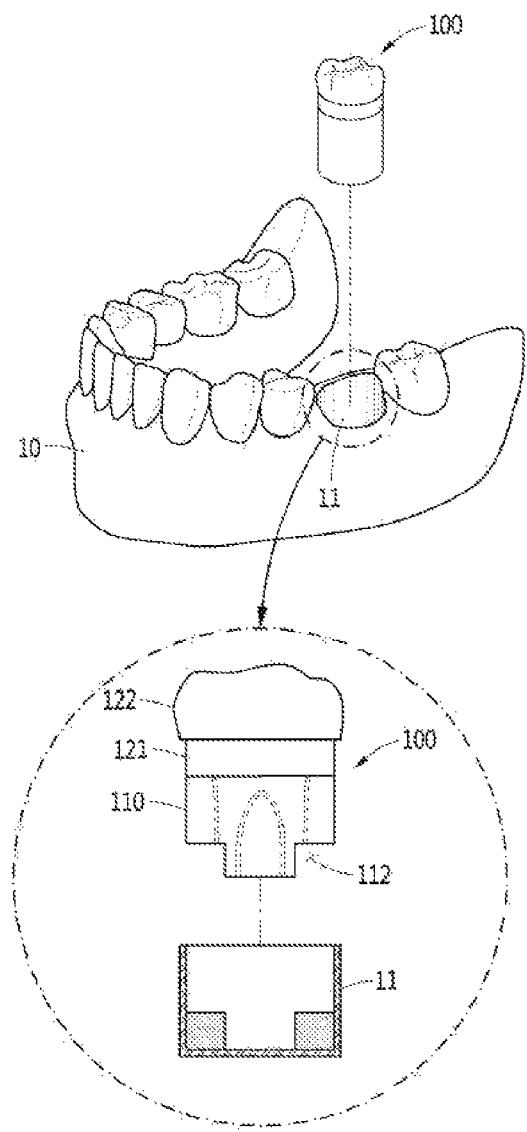
[FIG. 4]

[FIG. 5]
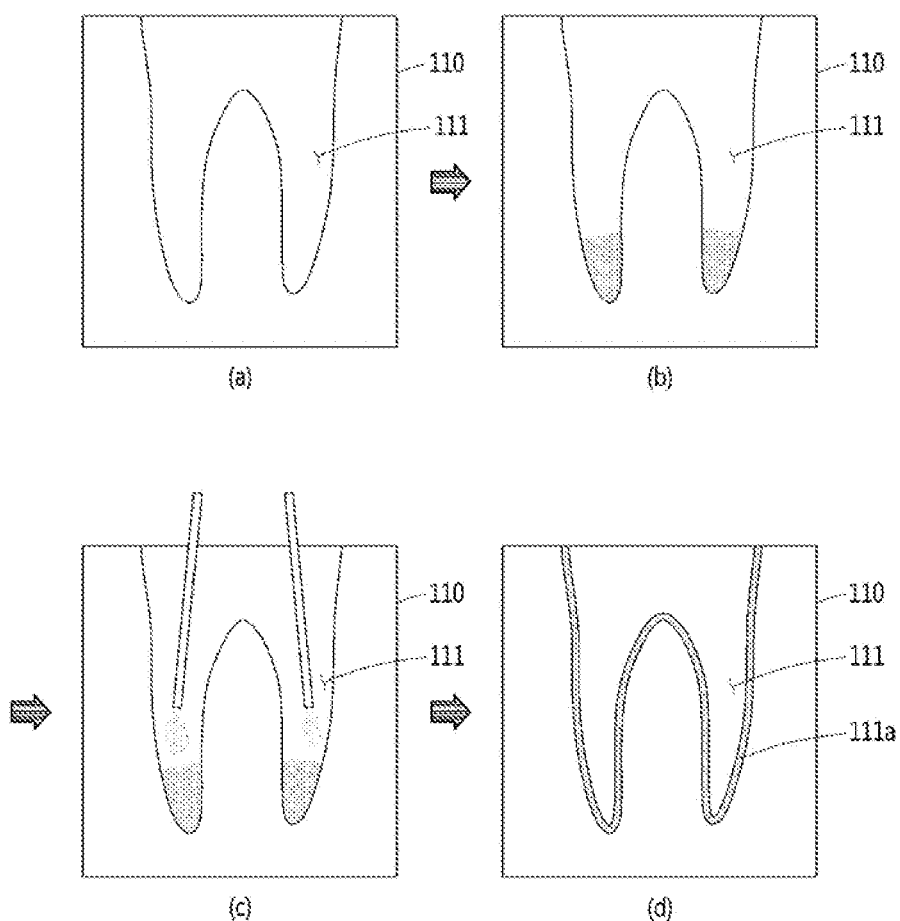

TOOTH MODEL FOR TOOTH TREATMENT PRACTICE AND METHOD FOR MANUFACTURING THE SAME

CROSS-REFERENCE TO RELATED APPLICATION

This application claims priority to Korean Patent Application No. 10-2021-0086444, filed on Jul. 1, 2021 in the Korean Intellectual Property Office, the disclosure of which is incorporated herein by reference.

BACKGROUND OF THE DISCLOSURE

Field of the Disclosure

The present disclosure relates to a tooth model, and more particularly, to a tooth model for dental treatment practice, with the same morphology and structure as a neural tube in actual teeth so as to be applicable to the practice, as well as a method for manufacturing the same.

Description of the Related Art

In general, endodontic treatment of a tooth is executed when odontopathogens such as cariogenic bacteria (commonly "tooth cavity") invade a dental nerve, in particular, the pulp cavity and root canal over the dentin of a coronal part causing pain.

The endodontic treatment may be a type of prosthetic treatment performed such that, when endodontic diagnosis is confirmed in a tooth, a hole is drilled in the tooth body using a dental treatment drill, dental tissue or a blood vessel of the dental nerve is removed using a device for nerve removal, and then the root canal is disinfected, followed by filling the root canal and the hole with alternative materials.

With regard to the endodontic treatment above, since the dental nerve should be completely removed while minimizing damage to the dentin of teeth in order to prevent recurrence of pain and preserve natural teeth as much as possible, dental neuropathic therapies must be thoroughly practiced to master neuropsychiatric techniques.

However, since tooth models even forming a neural structure inside a tooth for practice of such endodontic treatment are not sufficiently present in existing dental educational institutions, dental offices and dentistry seminar, etc., most students may observe the professor who practices the endodontic treatment and then may rely on audiovisual data as a result of recording the above practical treatment on a videotape, otherwise, typically learn such endodontic treatment using a general tooth model, hence causing a problem of deteriorated efficiency in practice.

In other words, since a typical tooth model is manufactured in a form in which only the external shape of a tooth or an oral cavity is formed, it is impossible to directly practice treatment of a neural portion formed in the tooth and, even if the practice is conducted using the above typical tooth model, correct identification of the neural structure and/or direct treatment for removal of dental nerves cannot be performed, and therefore, it is quite difficult to master endodontic treatment.

Therefore, in order to overcome the above problems, the existing tooth model has been manufactured by filling a neural tube formed in a root canal of a tooth with wax, thereby similarly imitating the same.

However, since the existing tooth model has a neural tube filled with wax and a nerve removing device (endodontic file) is smeared with sticky wax after removal of nerves, the nerves may not be clearly removed.

Further, in the case of conventional tooth models, the morphology of neural tubes formed in the root canal of a tooth is not sufficiently represented, which in turn is not suitable for practice. Further, when seen from the outside, the tooth model entails a problem in that the neural tube is not clearly distinguished.

RELATED ART LITERATURE

Patent Literature (Patent Document 1) Korean Patent Laid-Open Publication No. 10-2019-0143108 (Dec. 30, 2019)

SUMMARY OF THE DISCLOSURE

Therefore, the present disclosure has been made in view of the above problems, and it is an object of the present disclosure to provide a tooth model for dental treatment practice, in which an opaque material-based paint stains an inner surface of a neural tube formed inside a (dental) root canal of the tooth model composed of a transparent material, so as to show (or expose) the neural tube out of the root canal in the tooth model, as well as a method for manufacturing the same.

It is another object of the present disclosure to provide a tooth model for dental treatment practice, in which the inside of a neural tube has an empty, hollow form, thus enabling easy endodontic treatment practice, as well as a method for manufacturing the same.

It is still another object of the present disclosure to provide a tooth model for dental treatment practice, in which the inner surface of a neural tube is coated with a non-aqueous or insoluble resin-based paint so as to easily confirm whether nerves were sufficiently eliminated after removal thereof, and which can obviously indicate a condition of treatment after irrigation, as well as a method for manufacturing the same.

In accordance with an aspect of the present invention, the above and other objects can be accomplished by the provision of a tooth model for dental treatment practice, which is made of a transparent material, comprising: a root canal including a hollow neural tube formed therein; and a crown formed on top of the root canal, wherein a paint based on an opaque material is applied to an inner surface of the neural tube to form a coating layer so as to show the neural tube formed inside the root canal to the outside.

The paint may be composed of a non-aqueous material or an insoluble material.

The paint may be a resin based synthetic material.

The crown may include a dentin part composed of a soft material, and an enamel part composed of a hard material and formed on top of the dentin part.

The enamel part may be prepared by any one among a milling process, plastic injection molding and 3D printing.

The root canal may be inserted into a mounting groove formed on the dentiform in which the tooth model is mounted, and an intaglio and stepped part ("stepped part") bent down toward an inner bottom of a mounting groove may be formed on an outer surface of the bottom of the root canal.

In accordance with another aspect of the present invention, there is provided a method for manufacturing a tooth model for dental treatment practice, comprising: (a) a first step of preparing a root canal based on a transparent material, in which a hollow neural tube is formed; (b) a second step of introducing a paint based on an opaque material into the neural tube which is formed inside the root canal; (c) a third step of injecting air into the neural tube, to which the paint was introduced, in order to disperse the paint, thereby enabling the paint to be applied to an inner surface of the neural tube; and (d) a fourth step of allowing the paint applied to the inner surface of the neural tube to be cured or hardened over a predetermined time, so as to form a coating layer with a predetermined thickness on the inner surface of the neural tube.

The paint applied to the inner surface of the neural tube in step (d) may be used for surface-coating of the inner surface by any one process among flame heat treatment, high frequency inductive heat treatment, laser heat treatment, ultraviolet (UV) curing and infrared (IR) curing processes.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a cross-sectional view illustrating the tooth model for dental treatment practice according to an embodiment of the present invention;

FIG. 2 is a photograph illustrating the tooth model for dental treatment practice according to an embodiment of the present invention;

FIG. 3 is a photograph illustrating the tooth model for dental treatment practice in a state that the tooth model is mounted on a dentiform according to an embodiment of the present invention;

FIG. 4 is a perspective view and a cross-sectional view illustrating the tooth model for dental treatment practice according to another embodiment of the present invention; and FIG. 5 is a flowchart illustrating a method for production of a tooth model for dental treatment practice according to an embodiment of the present invention.

DETAILED DESCRIPTION OF THE DISCLOSURE

Hereinafter, preferred embodiments of the tooth model for dental treatment practice according to the present invention will be described in detail with reference to the accompanying drawings.

FIG. 1 is a cross-sectional view illustrating the tooth model for dental treatment practice according to an embodiment of the present invention; FIG. 2 is a photograph illustrating the tooth model for dental treatment practice according to an embodiment of the present invention; and FIG. 3 is a photograph illustrating the tooth model for dental treatment practice in a state that the tooth model is mounted on a dentiform according to an embodiment of the present invention.

Referring to FIGS. 1 to 3, the tooth model for dental treatment practice according to a preferred embodiment of the present invention may be a tooth model 100 manufactured with a size and shape similar to actual teeth in order to conduct dental treatment practice.

Herein, the tooth model 100 of the present invention may include a root canal 110 and a crown 120.

The root canal 110 may be composed of a transparent material to show the inside outward. Further, there is provided a neural tube 111 in an empty hollow form inside the root canal 110 of the tooth model 100.

In this case, in order to display the neural tube 111 formed inside the root canal 110 of the tooth model 100 to the outside, an opaque material-based paint may be thinly applied to an inner surface of the neural tube 111 to form a coating layer 111a.

Herein, the paint used to form the coating layer 111a is preferably a resin-based synthetic substance consisting of a non-aqueous or insoluble material not easily dissolved in water or alcohol.

Since the opaque material-based paint stains the inner surface of the neural tube 111 formed inside the root canal 110 of the tooth model which is composed of a transparent material, the neural tube 111 may be seen out of the root canal 110 of the tooth model 100.

Further, the neural tube 111 has an empty hollow form, thereby achieving an advantage of easy endodontic treatment practice.

The crown 120 may be formed on top of the root canal 110, and may include a dentin part 121 and an enamel part 122 composed of an opaque and rigid material on top of the dentin part 121.

In this regard, the dentin part 121 is preferably made of a resin-based synthetic substance, may be prepared by means of any one among a milling process, plastic injection-molding and 3D printing, however, the preparation method is not particularly limited to the above listed means.

Further, the enamel part 122 may be made of a specific material such as resin, zirconia and ceramics, etc., and may be prepared by means of any one among a milling process, plastic injection-molding and 3D printing, however, the preparation method is not particularly limited to the above listed means.

Meanwhile, the crown 120 may also be transparent wherein an upper side of the crown may be open.

FIG. 4 is a perspective view and a cross-sectional view illustrating the tooth model for dental treatment practice according to another embodiment of the present invention.

Referring to FIG. 4, there is further provided a stepped intaglio part ("stepped part") 112 on an outer surface of the bottom of the root canal 110 in the tooth model 100 for dental treatment practice.

Meanwhile, a dentiform 10, on which the tooth motel 100 of the present invention is mounted, may include a mounting groove 11 into which the root canal 110 is inserted, and a sill (jaw) may be formed on an inner surface of the bottom of the mounting groove 11.

In other words, since the stepped part 112 bent down toward the inner bottom of the mounting groove 11 formed in the dentiform 10 is formed on an outer surface of the bottom of the root canal 110, a mounting direction of the tooth model 100 can be marked and the tooth model 100 mounted on the dentiform 10 may be easily fixed when the root canal 110 is inserted into the mounting groove 11.

In this regard, a binding method between the above-described dentiform 10 and the tooth model 100 is illustrated only as an example, but is not particularly limited to any one binding way. Instead, the tooth model 100 may be bonded to the dentiform 10 by many different methods.

FIG. 5 is a flowchart illustrating a method for production of a tooth model for dental treatment practice according to an embodiment of the present invention.

Referring to FIG. 5, the method for production of a tooth model for dental treatment practice according to a preferred embodiment of the present invention may firstly include preparing a root canal 110 made of a transparent material, in which a hollow neural tube 111 is formed.

Herein, the root canal 110 may be formed by any one method of a milling process, plastic injection molding and 3D printing.

Then, an opaque material-based paint may be introduced inside the neural tube 111 formed in the root canal 110

Then, air is injected into the neural tube 111 containing the paint introduced therein, so as to uniformly distribute and thinly apply the paint to the inner surface of the neural tube 111.

Lastly, the paint applied to the inner surface of the neural tube 111 may be cured or hardened over a predetermined time to form a coating layer 111a with a predetermined thickness on the inner surface of the neural tube 111, thereby completing a tooth model.

In this regard, the paint applied to the inner surface of the neural tube 111 to form a coating layer 111a with a predetermined thickness on the inner surface of the neural tube 111 may be used for surface-coating of the inner surface of the neural tube 111 by any one among flame heat treatment, high frequency inductive heat treatment, laser heat treatment, ultraviolet (UV) curing and infrared (IR) curing processes, without particular limitation thereto.

Herein, the opaque material-based paint may stain the inner surface of the neural tube 111 formed inside the root canal 110 of the tooth model 100 composed of a transparent material.

The coating layer 111a stained on the neural tube 111 is formed of a resin-based synthetic material consisting of a non-aqueous or insoluble material not easily dissolved in water or alcohol and, therefore, is not easily removed and may improve durability.

According to the present invention, a paint made of an opaque material stains an inner surface of a neural tube formed inside a root canal of the tooth model composed of a transparent material, thereby attaining effects of expressing the neural tube out of the root canal in the tooth model.

Further, the tooth model of the present invention has a neural tube having an empty, hollow form, and may be easily used for practice of endodontic treatment.

Further, according to the present invention, a non-aqueous or insoluble resin-based paint is applied to the inner surface of a neural tube so as to easily confirm whether nerves were desirably eliminated after practice of nerve removal, and attain effects of clearly confirming a condition of treatment after irrigation.

Although the present invention has been described in detail with reference to preferred embodiments thereof, those skilled in the art will appreciate that the scope of the present invention is not limited to the embodiments and various modifications and improvements by those skilled in the art using the basic concept of the present invention defined in the appended claims are also within the scope of the present invention.

| [Description of Symbols] | |
|---|---|
| 10: Dentiform | 11: Mounting groove |
| 100: Tooth model | 110: Root canal |
| 111: Neural tube | 111a: Coating layer |
| 112: Stepped part | 120: Crown |
| 121: Dentin part | 122: Enamel part |

What is claimed is:

1. A tooth model for dental treatment practice, which is made of a transparent material, comprising:
   a root canal made of the transparent material and including a hollow neural tube formed in the root canal, wherein the hollow neural tube includes a hollow formed in the hollow neural tube, and the root canal is in a shape of a cylinder extending from an upper part of the root canal to a lower part of the root canal in a downward direction;
   a crown formed on top of the root canal; and
   a coating layer formed on an inner surface of the hollow neural tube,
   wherein a paint based on an opaque material is applied to the inner surface of the neural tube to form the coating layer on the inner surface of the hollow neural tube so as to show the neural tube formed inside the root canal to the outside,
   wherein the coating layer is formed on the inner surface of the hollow neural tube with a certain thickness such that the coating layer surrounds the hollow in the hollow neural tube,
   wherein a stepped part is formed at the lower part of the root canal,
   wherein the stepped part is bent down in the downward direction at the lower part of the root canal such that a size of the lower part of the root canal is smaller than a size of the upper part of the root canal,
   wherein the stepped part surrounds a portion of the hollow in the hollow neural tube, and
   wherein the root canal is inserted into a mounting groove formed on a dentiform in which the tooth model is mounted, and wherein the stepped part is bent down toward an inner bottom of the mounting groove.

2. The tooth model according to claim 1, wherein the paint is composed of a non-aqueous material or an insoluble material.

3. The tooth model according to claim 2, wherein the paint is a resin based synthetic material.

4. The tooth model according to claim 1, wherein the crown includes a dentin part composed of a soft material, and an enamel part composed of a hard material and formed on top of the dentin part.

5. The tooth model according to claim 4, wherein the dentin part and the enamel part are prepared by any one among a milling process, plastic injection molding and 3D printing.

* * * * *